US008626897B2

(12) United States Patent
Guo et al.

(10) Patent No.: US 8,626,897 B2
(45) Date of Patent: Jan. 7, 2014

(54) SERVER FARM MANAGEMENT

(75) Inventors: Wei-Qiang Michael Guo, Bellevue, WA (US); Ajay Wadhawan, Yarrow Point, WA (US); Lin Huang, Redmond, WA (US); Jacek T. Dudziak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 334 days.

(21) Appl. No.: 12/463,497

(22) Filed: May 11, 2009

(65) Prior Publication Data

US 2010/0287019 A1 Nov. 11, 2010

(51) Int. Cl.
*G06F 15/173* (2006.01)

(52) U.S. Cl.
USPC .................... 709/224; 709/223; 709/226

(58) Field of Classification Search
None
See application file for complete search history.

(56) References Cited

U.S. PATENT DOCUMENTS

| | | | |
|---|---|---|---|
| 6,148,335 A | 11/2000 | Haggard et al. | |
| 6,963,828 B1 * | 11/2005 | McDonald et al. | 703/22 |
| 7,146,353 B2 * | 12/2006 | Garg et al. | 1/1 |
| 7,171,668 B2 | 1/2007 | Molloy et al. | |
| 7,500,001 B2 * | 3/2009 | Tameshige et al. | 709/226 |
| 7,613,797 B2 * | 11/2009 | Stefaniak et al. | 709/221 |
| 7,647,405 B2 * | 1/2010 | Bivens et al. | 709/226 |
| 7,757,214 B1 * | 7/2010 | Palczak et al. | 717/121 |
| 7,769,843 B2 * | 8/2010 | Neuse et al. | 709/223 |
| 7,986,843 B2 * | 7/2011 | Chaudhury et al. | 382/229 |
| 8,060,599 B2 * | 11/2011 | Cherkasova et al. | 709/224 |
| 8,145,731 B2 * | 3/2012 | Cherkasova et al. | 709/220 |
| 2003/0154282 A1 * | 8/2003 | Horvitz | 709/226 |
| 2003/0177160 A1 * | 9/2003 | Chiu et al. | 709/100 |
| 2004/0103194 A1 * | 5/2004 | Islam et al. | 709/225 |
| 2004/0153481 A1 | 8/2004 | Talluri | |
| 2004/0220947 A1 * | 11/2004 | Aman et al. | 707/100 |
| 2004/0249939 A1 * | 12/2004 | Amini et al. | 709/225 |
| 2004/0267897 A1 * | 12/2004 | Hill et al. | 709/217 |
| 2005/0060389 A1 * | 3/2005 | Cherkasova et al. | 709/220 |
| 2005/0138170 A1 * | 6/2005 | Cherkasova et al. | 709/225 |
| 2005/0144280 A1 * | 6/2005 | Kawai et al. | 709/225 |
| 2005/0149940 A1 * | 7/2005 | Calinescu et al. | 718/104 |
| 2005/0228879 A1 * | 10/2005 | Cherkasova et al. | 709/224 |
| 2005/0278439 A1 | 12/2005 | Cherkasova | |
| 2005/0278453 A1 * | 12/2005 | Cherkasova | 709/231 |
| 2006/0089982 A1 * | 4/2006 | Abbott et al. | 709/223 |
| 2007/0233866 A1 * | 10/2007 | Appleby et al. | 709/226 |
| 2008/0077366 A1 * | 3/2008 | Neuse et al. | 703/2 |
| 2009/0089419 A1 * | 4/2009 | Saha et al. | 709/224 |
| 2009/0089699 A1 * | 4/2009 | Saha et al. | 715/771 |

OTHER PUBLICATIONS

"Transforming Capacity Planning in Enterprise Data Centers", 2008 Hewlett-Packard Development Company, http://docs.hp.com/en/15052/CapPlan4AA1-9758ENW.pdf.

(Continued)

*Primary Examiner* — Thu Nguyen
*Assistant Examiner* — Angela Widhalm
(74) *Attorney, Agent, or Firm* — Microsoft Corporation

(57) ABSTRACT

Techniques and systems are disclosed that can measure capacity of a server farm, and project capacity needs based on traffic and resources. Server farm system information is collected for managing the server farm by identifying a list of servers in the server farm. Performance metrics are collected from identified servers and stored in a collection database. The stored performance metrics are analyzed in accordance with a server farm management request.

20 Claims, 7 Drawing Sheets

(56) References Cited

OTHER PUBLICATIONS

"ITIL and CMDB: The Challenge in the Data Center", 2009, Aperture Technologies, Inc., http://www.aperture.com/solutions/vista_itil.php.

Barchi, Alfred J., "Throughput Capacity Planning and Application Saturation", 2007, Alfred J. Barchi, Inc., pp. 1-10, http://www.ajbinc.net/Assets/Throughput%Capacity%20Planning%20and%20Application%20Saturation.pdf.

"Neptuny Presents Capacity Planning for Heterogeneous Virtualized Environments at VMWorld Europe", 1999-2008, http://www.dabcc.com/article.aspx?id=9920.

"eG Citrix Monitor", 2003-2008 Portage Software Inc., pp. 1-4, http://www.portagesoftware.com/egcitrix.htm.

\* cited by examiner

SERVER FARM MANAGEMENT

BACKGROUND

In a computing environment, servers are often used to store and manage data. A server may be a typical computing device used by a consumer, for example, or a specialized computing device designed merely for specific data storage and management operations. Often servers can be used individually or linked together to provide services to users, such as a home computer network, an office data storage network, or an online gaming environment.

Servers may also be combined into a very large server farm that manages and stores very large amounts of data. Typical use of very large server farms may include online services systems, such as sites that provide Internet-based search engines, online mapping, document upload and retrieval services, and more. Other uses may include large enterprises, such as multi-national corporations and governmental operations, or large communication services, such as phone companies, Internet-service providers, and Internet-content provider or aggregators. These very-large server farms often comprise many hundreds or thousands of servers linked to appear as a single system to an end-user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Often, servers in a server farm are accumulated over time to increase capacity as usage grows. Because the computer-based hardware development cycle is progressing rapidly, accumulated hardware for a server farm is typically heterogeneous (e.g., more recently added hardware is of differing types or configurations than previously added hardware). Therefore, a server farm can have hardware of different row power, such as computer processing unit (CPU) and input/output (I/O) bandwidth.

Having heterogeneous hardware configurations in a server farm can make it difficult and expensive to benchmark individual server performance, as each server may need to be tested instead of testing one and apply the results to the rest. Further, an aggregated performance of the heterogeneous servers may be quite different from an additive summation of individual performances, which can make it difficult for desired load-balancing, among other things, of the system. Additionally, aggregated performance of a heterogeneous hardware configuration is very complicated and difficult to replicate in a laboratory environment, due to large volumes of traffic in real-life. Combined, these problems provide a complicated task for system administrators to effectively manage a server farm, such as capacity resource management and planning.

Prior solutions focus on benchmarking an application against a few varieties of hardware row power, and derive mathematical models of projected software capacity in non-test hardware configurations. These methods are expensive and typically require extensive testing. Further, prior methods do not produce aggregated performances for heterogeneous hardware configurations in a sever farm, nor can they project resource planning needs.

Techniques and systems are disclosed herein that directly measure capacity of a server farm, and can heuristically project capacity expansion needs based on traffic growth trends. Further, the techniques and systems allow a server farm that comprises heterogeneous hardware configurations to be managed more effectively.

In one embodiment, collecting and analyzing server farm system information for effectively managing a server farm comprises identifying a list of servers that are running in the server farm, for example, by accessing a server farm database that comprises active servers and respective application services running on the servers. Once servers are identified, performance metrics can be collected from the servers, such as hardware metrics (e.g., CPU speed, I/O bandwidth, storage, memory) and server usage metrics (e.g., applications, traffic counts, response times), and stored in a collection database. The stored performance metrics can then be analyzed in accordance with a server farm management request, such as from an administrator or an automated system request.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
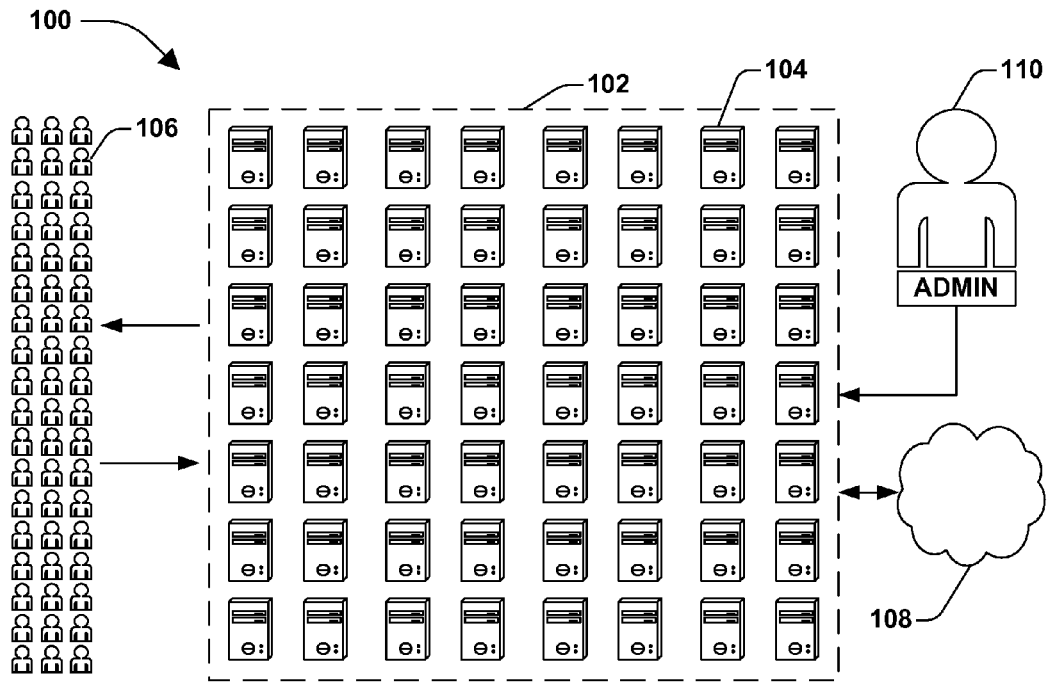
FIG. 1 is a diagram illustrating an exemplary environment where a server farm may be utilized.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a diagram illustrating an exemplary environment 100 where a server farm may be utilized. A server farm 102 can comprise a plurality of servers 104, such as special purpose computers that are designed to store and manage data (e.g., store custom applications used to serve user requests such as user login authentication, store user data for custom application needs, and/or perform customized processing, not directly taking traffic from end users, but performing (constant) offline processing). It will be appreciated that a server in a data storage and management network, such as a server farm, can be a device attached to the network as a connection point, redistribution point or communication endpoint. A server may be capable of storing, sending, receiving, and/or forwarding information for a network, and could comprise any device that meets any or all of these criteria.

In one embodiment, a plurality of users 106 may be connected to the server farm 102 over a connection network, such as the Internet. As an example, a server farm may be part of an Internet-based services network (e.g., search engine, map service, virtual storage) that allows users 106 to retrieve information that may be stored on or accessed by the server farm 106. The server farms can be further connected to other networks 108, such as the Internet, for updating and retrieving information stored on the servers 104 in the server farm 102.

Typically, one or more administrators 110 are tasked with managing the server farm's operations, which can include ongoing software and hardware maintenance, as well as planning for capacity increases based on user traffic. For example, as more users 106 access the server farm, and/or more services are added to the server farm, a corresponding increase in user traffic is likely. Therefore, in this example, an administrator 110 may wish to plan for adding hardware and/or software resources to the server farm based on the increase in traffic.

Figure 2:
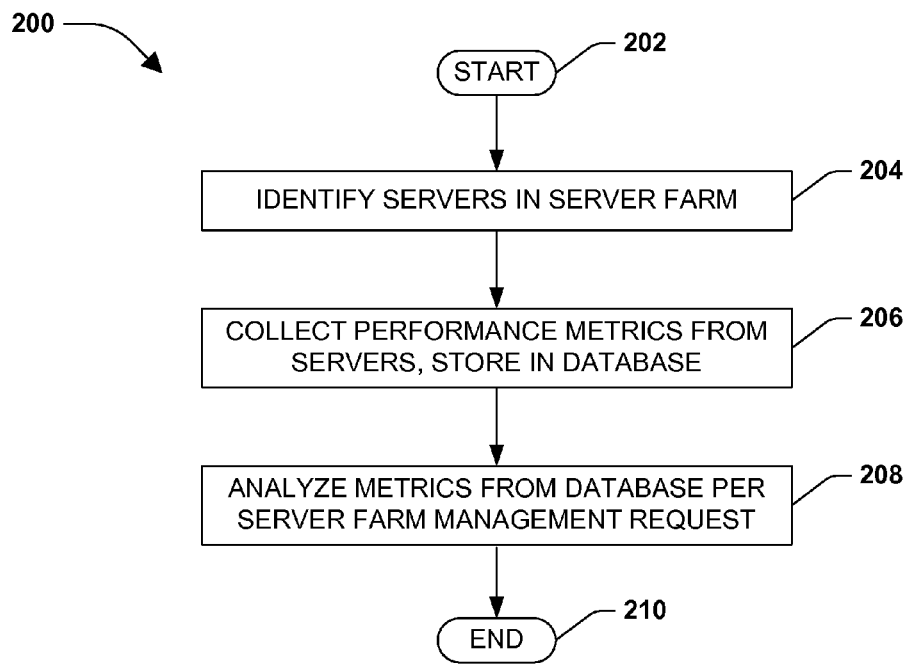
FIG. 2 is a flow chart diagram of an exemplary method for collecting and analyzing server farm system information for effectively managing a server farm.

A method may be devised that provides for collecting computing resource consumption information for a server farm, and analyzing that information in association with the server farm's resources to develop capacity planning information, for example. FIG. 2 is a flow chart diagram of an exemplary method 200 for collecting and analyzing server farm system information for effectively managing a server farm.

The exemplary method 200 begins at 202 and involves identifying a list of servers running in the server farm, at 204. In one embodiment, the list of servers may be retrieved from a database that is used to store hardware and software configurations for the server farm. Some large server farms that are used to provide online services can comprise hundreds or thousands of servers, for example, so an administrator may utilize a database to facilitate management of the multitude of servers and services.

Further, in one embodiment, the hardware configurations for servers in the server farm may be heterogeneous. For example, when a new server is added to the server farm, or a hardware upgrade is undertaken, the newly installed hardware may be different than the existing servers or hardware. Therefore, in this embodiment, when identifying the servers in the server farm, two or more servers may be heterogeneous, comprising different hardware configurations.

At 206, performance metrics are collected from respective identified servers and stored in a collection database. Respective servers that are identified in the list of servers for the server farm can be probed to determine performance metrics.

In one embodiment, collecting performance metrics can comprise collecting hardware configuration metrics for a server, and collecting server usage metrics for the server. For example, in order to develop a resource capacity plan for the server farm, an administrator may wish to identify specific hardware and software configurations for respective servers, along with traffic patterns and resource usage over time.

Figure 3:
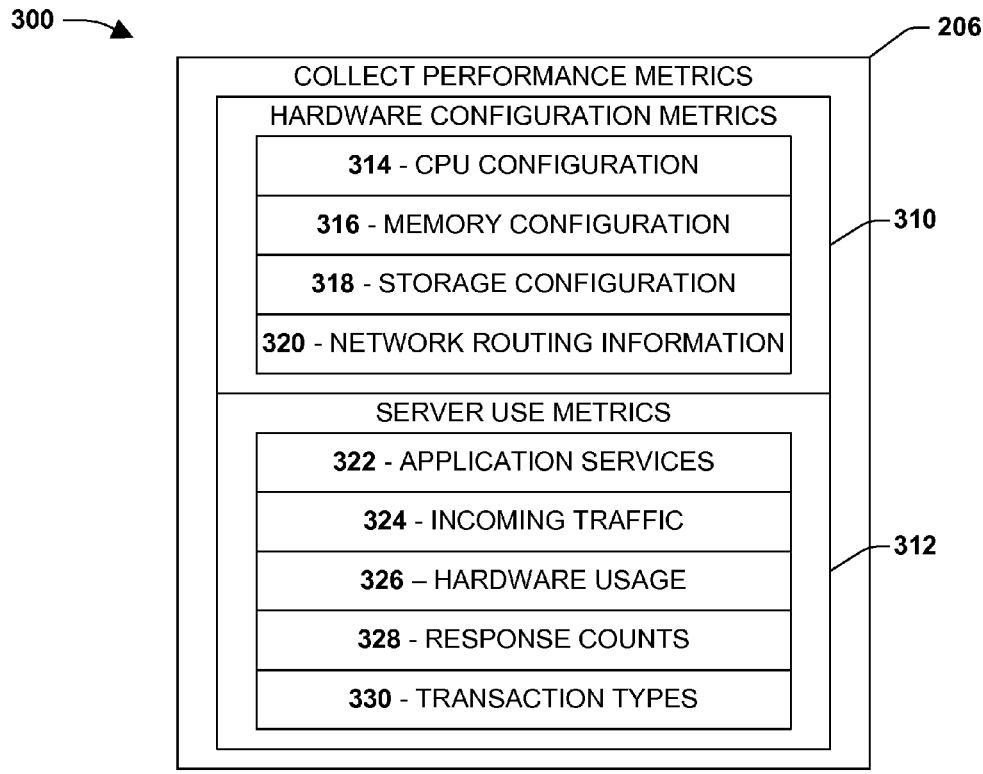
FIG. 3 is an embodiment of a portion of an exemplary method where configuration metrics and server usage metrics that can be collected.

One embodiment 300 of hardware configuration metrics and server usage metrics that can be collected is illustrated in FIG. 3. In this embodiment 300, collecting hardware configuration metrics 310 can comprise collecting central processing unit (CPU) configuration information for the server 314, such as CPU type and processing speed. Further, collecting hardware configuration metrics 310 can comprise collecting memory configuration information for the server 318, such as size and speed. Additionally, collecting hardware configuration metrics 310 can comprise collecting storage configuration information for the server 318, such as disk size and speed. Collecting hardware configuration metrics 310 can also comprise collecting data traffic routing information for the server 320, such as bus speed, and amounts and types of connections (e.g., network and database connections).

In this embodiment 300, collecting server usage metrics 312 can comprise collecting information for application services installed on the server 322, such as the types and number of applications running on the server that are utilized by server farm users (e.g., 106 from FIG. 1). Further, collecting server usage metrics 312 can comprise collecting incoming traffic counts over time to the server 324, such as a number of requests for data from the server farms (e.g., as sent by users of an online service). Collecting server usage metrics 312 can comprise collecting server hardware usage data 326 for the respective hardware units associated with a server, such as CPU, memory, I/O elements, bandwidth, and/or database connections, for example. Additionally, collecting server usage metrics 312 can comprise collecting response counts over time from the server 328, such as responses to requests sent by the servers in the server farm. Collecting server usage metrics 312 can also comprise collecting transaction types for the server 330, such as a type of request and/or type of response.

In one aspect, collecting hardware configuration metrics and server usage metrics can be based on a type and location of the server in the server farm, and services that it may provide, for example. For example, a server farm may comprise front end web-based services that can be accessed by users to provide the web-based services, such as search engines, mapping, document storage and retrieval. In this example, the front end servers may comprise one or more applications configured to provide services to the users, CPUs that provide faster processing speed, and larger/faster memory for running multiple applications.

Further, in this aspect, a server farm may comprise backend storage-focused servers that can provide large amounts of data storage for a server farm. For example, where a server farm may be used to provide online services, the backend servers may be used to store indexes for search engine document retrieval, data to provide maps for an online mapping service, and documents stored by users of a document storage and retrieval service. In this example, the servers may comprise large amounts of disk or other non-volatile data storage, along with network connections for database management, and data storage and retrieval operations.

In another aspect, collection of performance metrics for a server farm may be based on a type of analysis that is requested or pre-determined by rules setup by an administrator or automated system manager. In one embodiment, when collecting data for a capacity calculation or forecast, elements of the calculation can be collected by identifying where a bottle neck in the hardware configuration may occur (if at all). For example, during performance metric collection, one may be able to identify that a first bottle neck in the data request/response stream occurs in the CPU, memory, a database connection, or the I/O services. In this way, in this example, resource planning may be undertaken based on identifying potential bottlenecks in the hardware configuration.

In one embodiment, the server identification and metric collection can be automated, such that the server farm periodically collects performance metrics for its respective servers and stores the information in the collection database. In this way, in this embodiment, current and historical information may be available for analysis at anytime, for example, by a system administrator or by some automated server farm management tool. In another embodiment, the server identification and metric collection may be in response to a specific command by the system administrator, for example, in response to a specific server farm management request.

It will be appreciated that the methods and systems, described herein, are not limited to the performance metrics embodiments described above. These embodiments are illustrative of typical types of performance metrics that can be utilized by the methods and systems, described herein, however, it is anticipated that those skilled in the art may devise alternate performance metrics that can be collected and utilized in these methods and/or systems.

Returning to FIG. 2, at 208 of the exemplary method 200, the performance metrics stored in the collection database are analyzed in accordance with a server farm management request. In one embodiment, a server farm management request may comprise an automated request sent by a component in the server farm management component. For example, the server farm management component may wish to periodically determine whether the current resources are capable of handling the expected traffic load at a desired response rate, such as for alerting purpose. In another embodiment, a request may be developed by a system administrator for a particular purpose, such as developing a resource capacity plan for adding new hardware.

Figure 4:
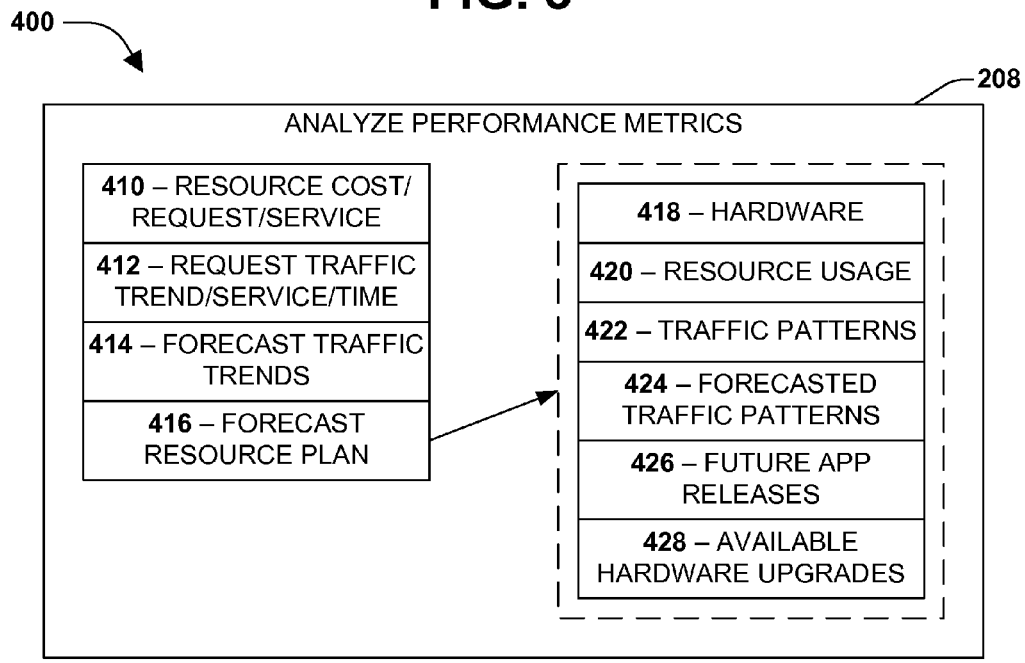
FIG. 4 is a chart diagram illustrating one embodiment of how data stored in a collection database may be analyzed.

FIG. 4 is a chart diagram illustrating one embodiment 400 of how data stored in the collection database may be analyzed. At 208, the performance metrics stored in the collection database can be analyzed by determining a resource cost on a server per request per service 410, such as how much CPU time, memory, I/O resources, or disk space is used to perform a particular service request. In another embodiment, a function curve of a resource cost on a server per request per second can be determined to illustrate a non-linear relationship between requests and hardware. Further, the performance metrics can be analyzed 208 by determining a traffic trend of requests per service over time 412, such as identifying peak usage of a particular service. Additionally, the performance metrics can be analyzed 208 by determining a forecast of traffic trends for the server farm 414, such as identifying potential increases in traffic for a particular service and/or server. The performance metrics can also be analyzed 208 by determining a forecasted server farm resource capacity plan 416, such as determining what type and amount of new hardware may be used to keep up with potential traffic trends.

In this embodiment 400, determining a forecasted server farm resource capacity plan 416 can be based on one or more factors. Existing server farm hardware 418 (e.g., types of servers, CPU speed, memory size, storage space, I/O resources, etc.), server farm resource usage 420 (e.g., which servers, storage, I/O, etc. are used more than others), and server farm traffic patterns 422 (e.g., how many requests for which services) can be utilized for forecasting a resource capacity plan. Further, in this embodiment 400, forecasted server farm traffic patterns (e.g., as in 414) can be used to plan. Additionally, future releases of application services for the server farm, and available hardware upgrades to the server farm can be utilized when developing a resource capacity plan, such as to determine which applications and/or hardware upgrades can yield an improved response time or resource use per request cost.

It will be appreciated that the methods and systems, described herein, are not limited to the analysis embodiments described above. These embodiments are illustrative of typical types of analysis that can be utilized by the methods and systems, described herein, however, it is anticipated that those skilled in the art may devise alternate analysis that can performed by these methods and systems.

Returning to FIG. 2, having analyzed the data stored in the collection database, the exemplary method 200 ends at 210.

Figure 5:
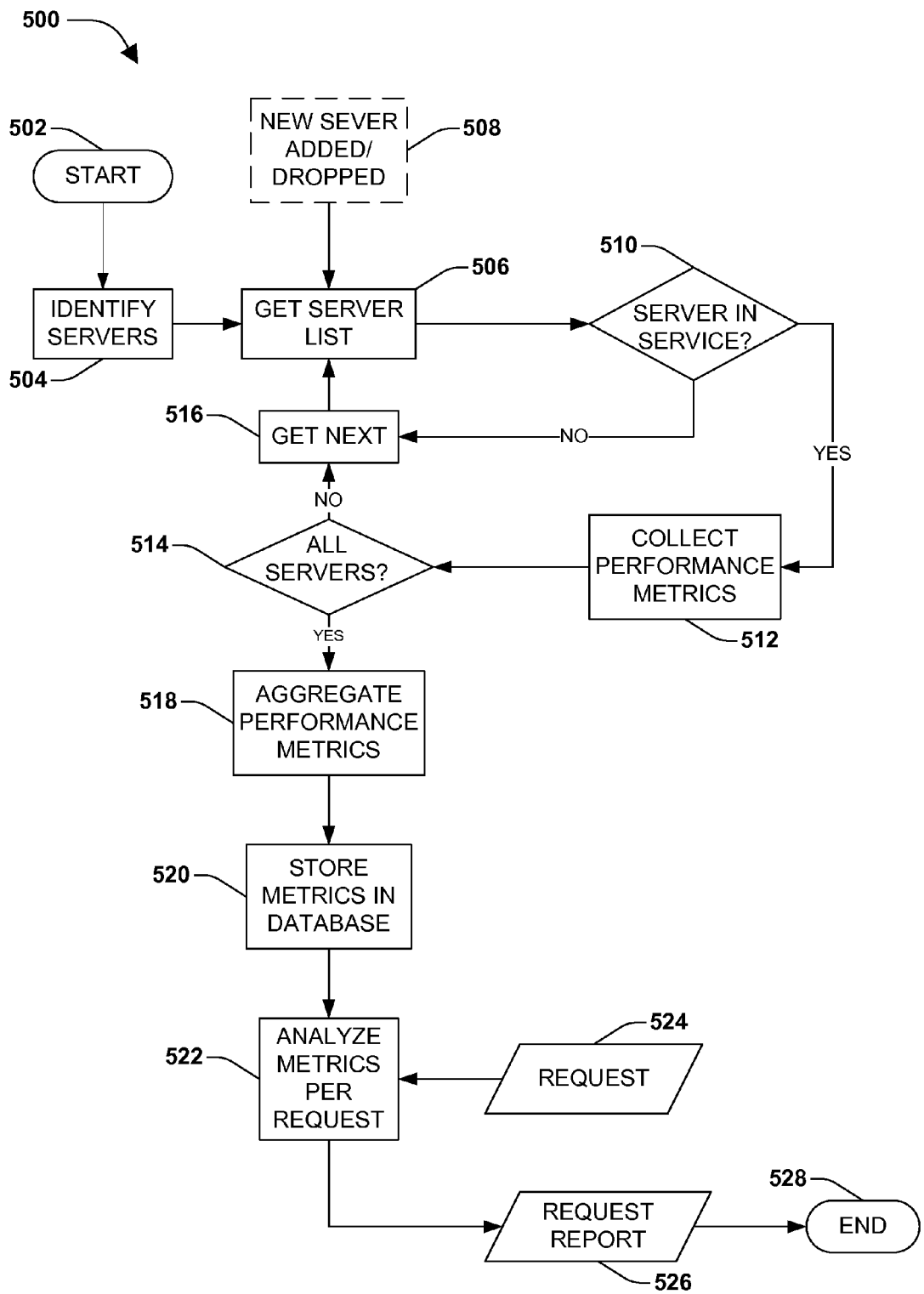
FIG. 5 is a flow chart diagram illustrating one embodiment of an application for collecting and analyzing server farm system information for effectively managing a server farm.

FIG. 5 is a flow chart diagram illustrating one embodiment 500 of an application of the methods for collecting and analyzing server farm system information for effectively managing a server farm, described herein. At 504, the servers that comprise the server farm are identified. The list of servers is obtained at 506, which may be collected from a server farm database that stores information pertaining to the server farm's topology (e.g., hardware and software configurations). In this embodiment, if as server is added to (e.g., new hardware added or restored service to a machine) or removed from (e.g., taken out of service or system error), at 508, it may be automatically identified in the list of servers (or removed from the list).

At 510, it can be determined whether a particular server is actually in service (e.g., operating appropriately) in the server farm. If not, at 516, a next server can be identified and determined whether it is in service. If the server is in service, at 512, the particular server can be probed for performance metrics, which can be collected. At 514, the respective servers are identified and performance metrics are collected for the respective servers, at 512.

At 518, the collected performance metrics can be aggregated, such as by server, service, historically, or some other aggregation, and stored in a collection database, at 520. It will be appreciated that the server farm's topology database and the collection database may be comprised in a same component, distributed over the server farm, or maintained as separate entities.

At 522, the metrics stored in the collection database can be analyzed in accordance with a server farm management request 524. A request 524 may be generated by a server farm management component (e.g., automatically) in response to some activity or occurrence within the server farm, such as an automated resource capacity alert. Further, a request 524 may be generated by a user interface utilized by a server farm administrator, such as for capacity planning. In this embodiment, 500, a response report 526 can be returned from the analysis 522, for example, to the server farm management component or the system administrator.

In one embodiment, desired historical performance metrics may not be available for a particular server. As an example, when a new server is brought online, and or a new service is introduced on a server, historical metrics for that server would not be available. In this embodiment, corresponding lab derived performance metrics may be used when analyzing performance metrics. For example, while performance metrics may not be available for a particular server that is recently added to service, performance metrics for a comparable server having a comparable hardware configuration may have been collected in lab testing. In this embodiment, if the hardware configuration of the lab tested hardware is comparable to the newly installed hardware, the corresponding lab data can be used for the analysis of the server.

In one embodiment, a lab may utilize fixed hardware to derive a relative hardware cost of requests of different services running in a server farm. In one example, the relative costs between requests of services for the server farm can be derived by applying the relative cost to different physical hardware machines based on performance/resource usage data that has been collected, and deriving a request per cost on those different sets of physical machines. Further, in one embodiment, traffic cost can be forecast on yet to be added machines, based on a machine's relative characteristics as compared with tested hardware configurations. In one example, a resource cost can be obtained through a request pipe-line (e.g., to determine a front end (FE) service cost, middle tier cost and/or backend cost). In general, one backend component (e.g., SQL) supports multiple front end components. There could be a bottle neck on a backend component (e.g., SQL) before front end components experience bottlenecks (e.g., related to CPU, Memory etc), such that capacity planning could use the pipe-line cost module when forecasting whether the capacity of the system can provide adequate support, or whether one or more new hardware matrices should be investigated to provide the needed support.

Figure 6:
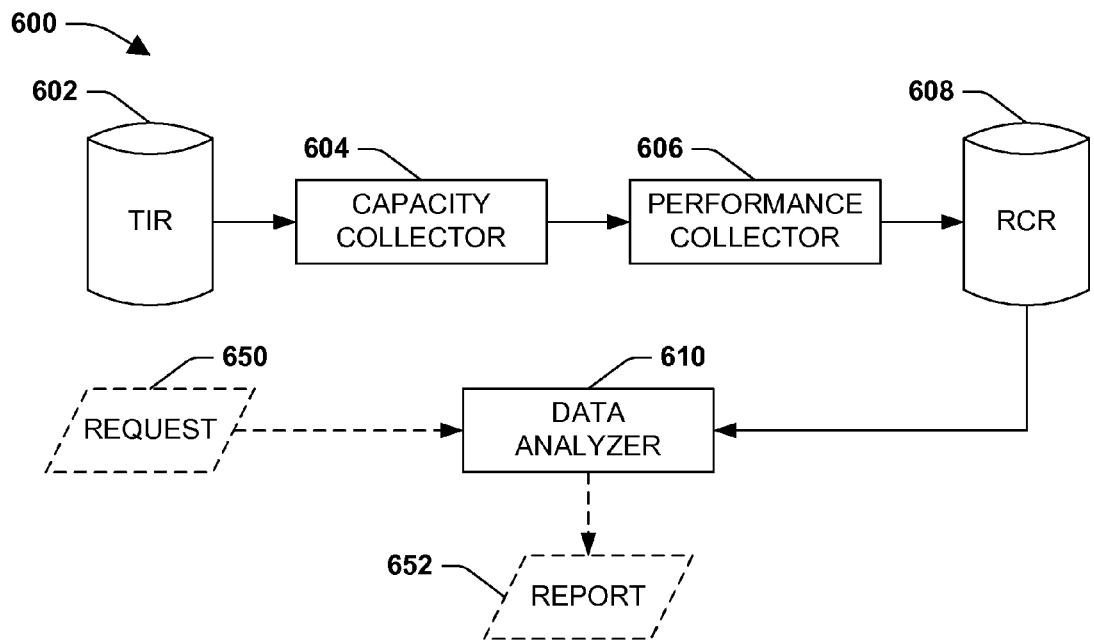
FIG. 6 is a component block illustrating an exemplary system for collecting and analyzing server farm system information for effectively managing a server farm.

A system may be devised that provides for collecting computing resource consumption information for a server farm, and analyzes the information in association with the server farm's resources to develop capacity planning information, for example. FIG. 6 is a component block diagram of an exemplary system 600 for collecting and analyzing server farm system information for effectively managing a server farm. For example, the exemplary system may be utilized by a system administrator to develop a resource plan for the server farm based on its capacity and use.

The exemplary system 600 comprises a topology information repository 602 (TIR) that is configured to store information for hardware and services running in the server farm. For example, the server farm may comprise a plurality of servers, each having one or more services (e.g., Internet-based services) running on them. In this example, the TIR 602 can be used to store server configuration information and respective service configuration for the servers. In one embodiment, the TIR may be comprised in its own storage system; however, the system is not limited to this embodiment. For example, the TIR may comprise a distributed database, distributed over a plurality of servers in the server farm. Further, for example, the TIR may be comprised in a shared database that shares resources with one or more other databases for the server farm.

The exemplary system 600 comprises a capacity collector 604 that is disposed on one or more servers in the server farm. For example, the capacity collector 604 may be a component disposed on a specialized server in the server farm, or it may be distributed over a plurality of servers on the server farm. The capacity collector 604 is configured to collect from the TIR 602 a list of servers running in the server farm and corresponding services running on the respective servers.

The exemplary system 600 further comprises a performance collector 606 that is operably coupled to the capacity collector 604. The performance collector 606 is configured to collect performance metrics from the servers and services identified by the capacity collector 604. In one embodiment, the performance collector 606 may be distributed over a plurality of servers in the server farm, and may collect performance metrics from respective servers on which it resides. In this embodiment, the capacity collector 604 may send information to the distributed performance collector 606, identifying respective servers and services.

In another embodiment, the performance collector 606 may reside on a specialized server, from which it probes respective identified servers for performance metrics, for example, pulling the metrics from the servers. In this embodiment, for example, a list of servers and services can be retrieved from (or sent from) the capacity collector 604. In another example, respective servers and their corresponding services may be retrieved from (or sent from) the capacity collector 604 as needed to complete the metrics retrieval process.

The exemplary system 600 further comprises a resource consumption repository 608 (RCR) that is operably coupled to the performance collector 606. The RCR 608 is configured to store performance metrics collected by the performance collector 606. In one embodiment, the RCR may be comprised in its own storage system; however, the system is not limited to this embodiment. For example, the RCR may comprise a distributed database, distributed over a plurality of servers in the server farm. Further, for example, the RCR may be comprised in a shared database that shares resources with one or more other databases for the server farm.

In one embodiment, the RCR 608 may be utilized to store historical performance metrics for the server farm. For example, the exemplary system 600 may be devised to automatically perform periodic capacity collection and performance collection operations. The automated data collection information can comprise historical information for particular servers and services running in the server farm, such as traffic counts, response times, etc. Therefore, for example, the RCR 608 may comprise both historical and current performance metrics for the respective servers and services running in the server farm.

The exemplary system 600 further comprises a data analyzer 610 that is operably coupled to the RCR 608. The data analyzer 610 is configured to analyze performance metrics stored in the RCR 608 in accordance with a server farm management request 650. For example, a request 650 for analysis may be an automated task from a server farm management component or created by a system administrator. The data analyzer 610 can facilitate in generating an analysis report 652 that is responsive to specific request elements (e.g., customized).

Figure 7:
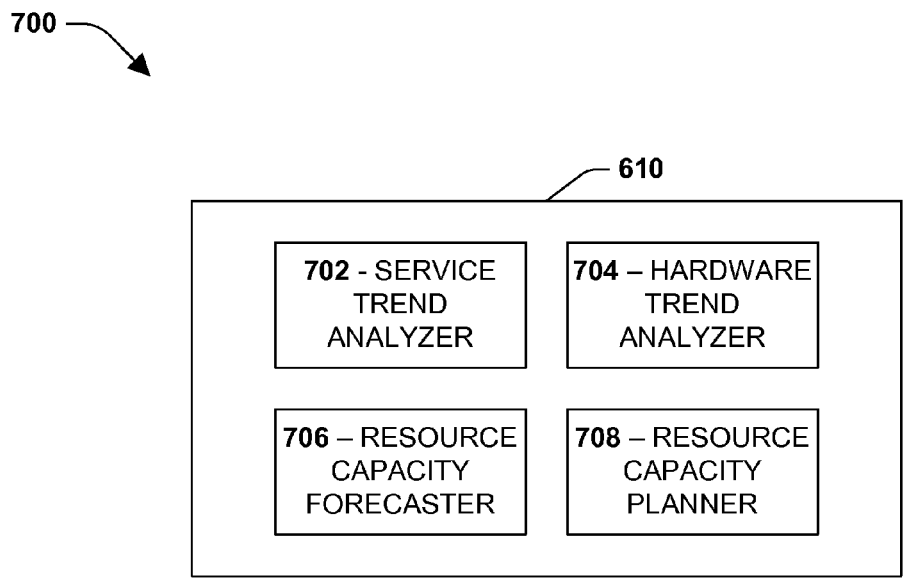
FIG. 7 is an illustration of one embodiment of a component for a system for collecting and analyzing server farm system information for effectively managing a server farm.

FIG. 7 illustrates one embodiment 700 of the data analyzer 610, where the data analyzer 610 comprises a service trend analyzer 702, which can be configured to determine server farm user requests per service type trend information. For example, the service trend analyzer 702 may use the user requests for a particular service to determine a trend, such as a function that illustrates an increase of requests over time. In this way, in this example, an administrator may be able to identify when a resource limit for the server farm may be reached.

In the exemplary embodiment 700, the data analyzer 610 further comprises a hardware trend analyzer 704 that is configured to determine server farm user requests per hardware type trend information. For example, the hardware trend analyzer 702 may use the user requests that route to a particular server to determine a trend, such as a function that illustrates a how requests may be increasing over time for the server. In this way, in this example, the trend information may be used to forecast a resource plan that identifies a type and configuration of hardware that may handle the request trends.

The data analyzer 610 further comprises a resource capacity forecaster 706, which is configured to determine a resource capacity for the server farm based on the trend information. As an example, the trend information generated by the service trend analyzer 702 and/or the hardware trend analyzer 704 may be used by the resource capacity forecaster 706 to determine when the server farm resources may no longer be capable of handling requests at a desired response rate, or at a desired resource cost per request. In one embodiment, an alert may be generated when the resource capacity forecaster 706 determines that a threshold for resource capacity is reached by requests. In this way, in this example, an administer may take action to prevent an undesirable response times that could affect user loyalty to an online services site.

The data analyzer 610 further comprises a resource capacity planner 708 that is configured to determine planned resource additions for the server farm based on the trend information. For example, by utilizing trend information and existing hardware metrics, the resource capacity planner 708 may be able to determine what type and amount of hardware and/or software upgrades may be needed to meet a desired service level, such as response time and/or resource cost per request. Further, in one embodiment, the resource capacity planner 708 may be used to compare changes in response time and/or resource cost per request for alternate hardware and/or software upgrade configurations. In this way, for example, an administrator may more readily plan for future upgrade costs and scheduling.

Figure 8:
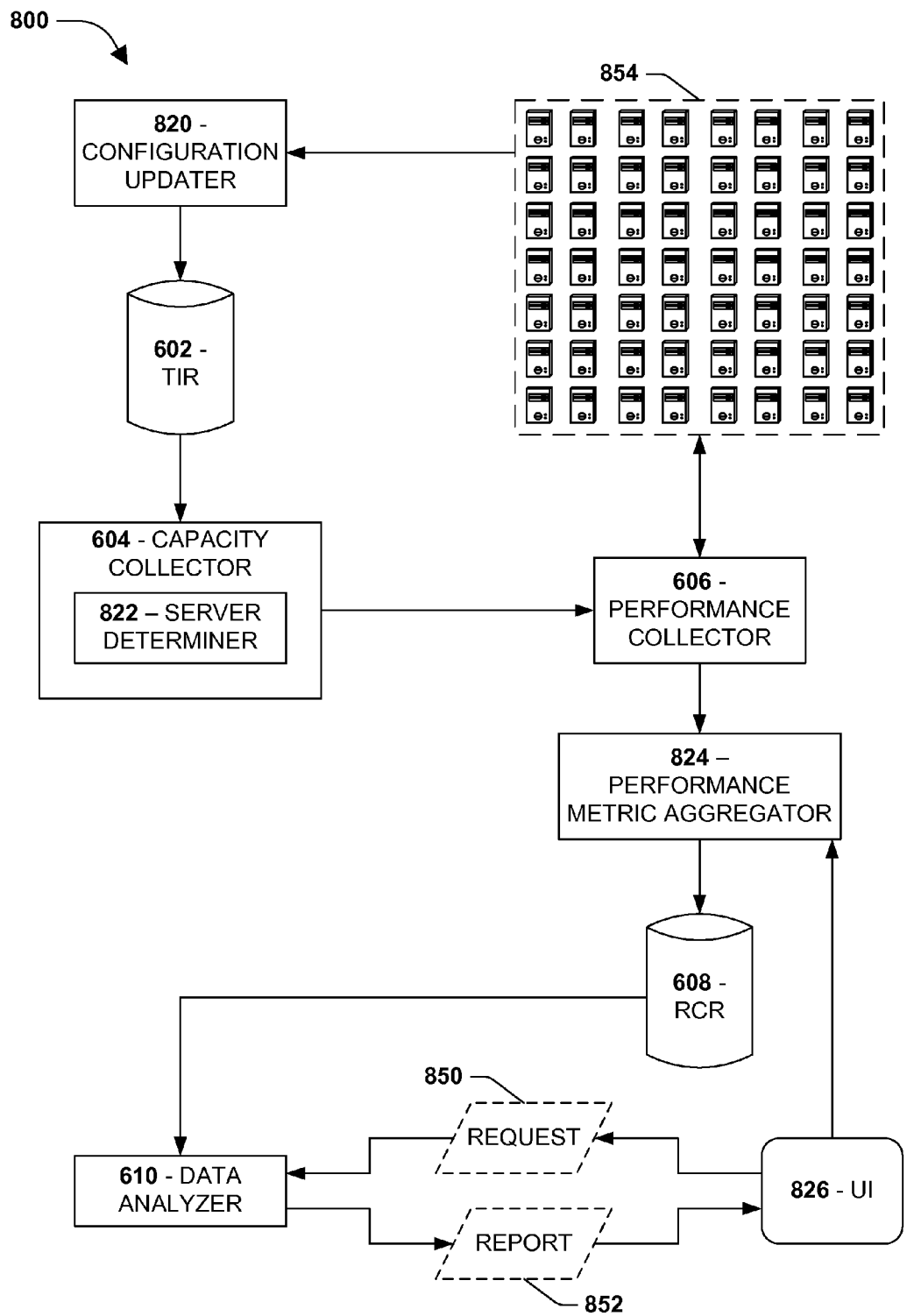
FIG. 8 is an illustration of an exemplary environment where one embodiment of one or more of the systems described herein may be utilized.

FIG. 8 is an illustration of an exemplary environment 800 where one embodiment of the systems described herein may be utilized. In this embodiment, a server farm 854 comprises a plurality of servers, for example, that may be used to service user requests. For example, a server farm may be utilized by an online services system (e.g., Internet-based search engine and other services), for enterprise data management (e.g., large corporate or government data storage and management), and data traffic routing (e.g., internet service providers, online content providers/aggregators).

In this embodiment, the system comprises a server farm configuration updater 820 that can be configured to update database information for hardware and services running in the server farm 854 stored in the TIR 602. For example, servers, other hardware, and software components may be added (e.g., coming online after a fault, or upgrades), and/or dropped (e.g., system failure, or upgrades) from the server farm on an ongoing basis. In one embodiment, the server farm configuration updater 820 can detect when a server is added and/or dropped from active service in the server farm and update the TIR 602 accordingly.

In this exemplary embodiment, the capacity collector 604 comprises a server service determination component 822 that is configured to determine whether a server identified from the TIR 602 is in-service in the server farm. While the configuration updater 820 may be able to provide updated database information, the server service determination component 822 can be used to probe a particular server that is identified by the capacity collector 604 to determine whether it is still active, for example.

Further, in the exemplary embodiment, the system comprises a performance metric aggregator 824, which is configured to aggregate performance metrics collected by the performance collector 606 in accordance with pre-determined rules. In one embodiment, an administrator may utilize a user interface 826 to set up aggregation rules for the performance metric aggregator 824. As an example, the aggregation rules may provide for aggregating incoming requests for a particular service on a particular server over a desired period of time. In this way, merely the data that is desired can be collected and aggregated in a useful manner, for example.

Additionally, in the exemplary embodiment, the system comprises a user interface 826 (UI), which can be configured to provide a server farm administrator with an ability to request server farm data analysis. As described above, a request 850 for data analysis may be automated or can come from a system administrator, for example. In this embodiment, the UI 826 can be used by the administrator to construct data analysis requests based on particular needs of the administrator. The UI 826 may be operably coupled with the data analyzer 610, which can retrieve information needed for the request from the RCR 608. After the requested analysis is performed, a report can be sent back to the UI 826 and utilized by the administrator.

Figure 9:
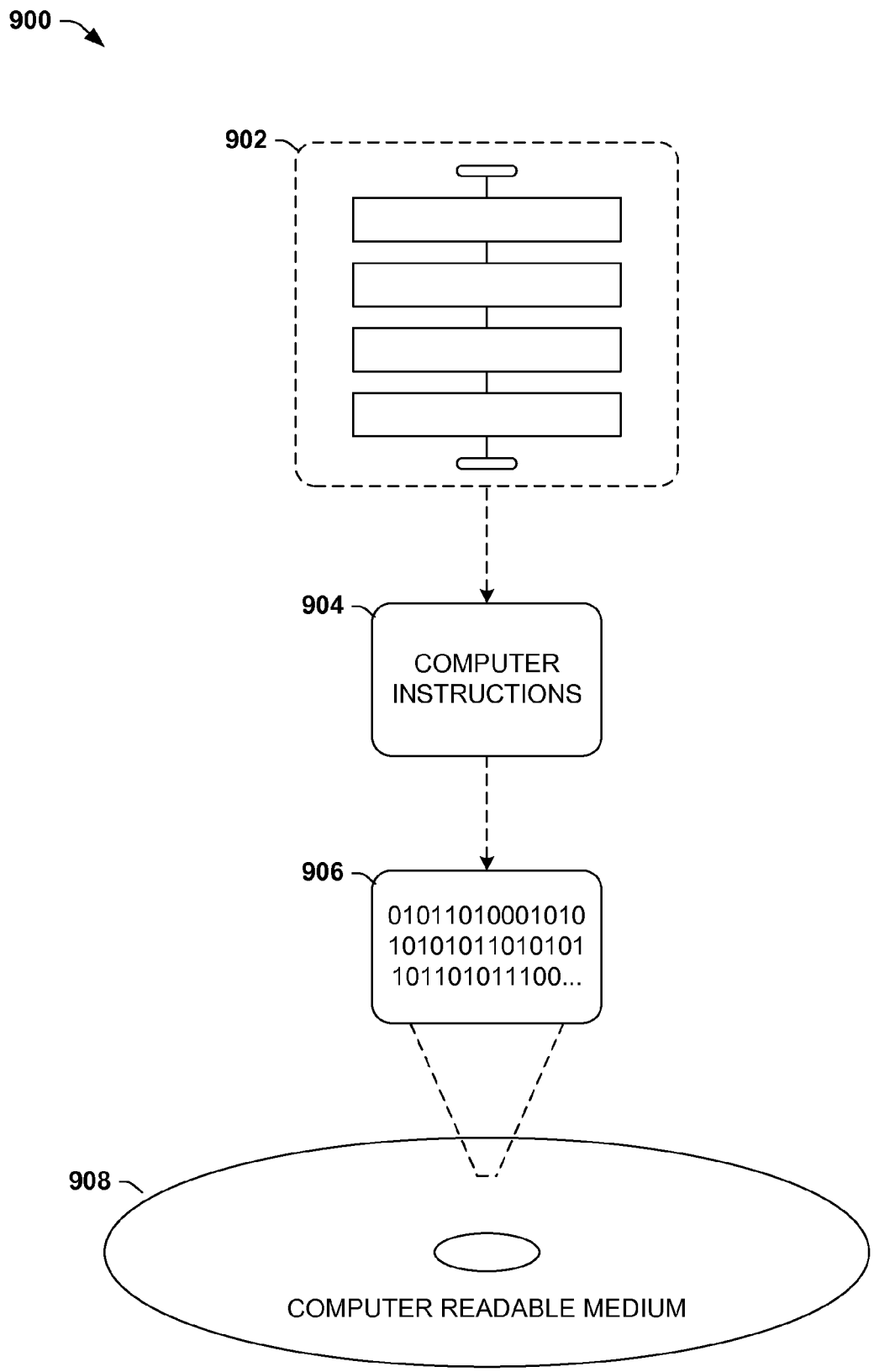
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as the exemplary method 200 of FIG. 2, for example. In another such embodiment, the processor-executable instructions 904 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
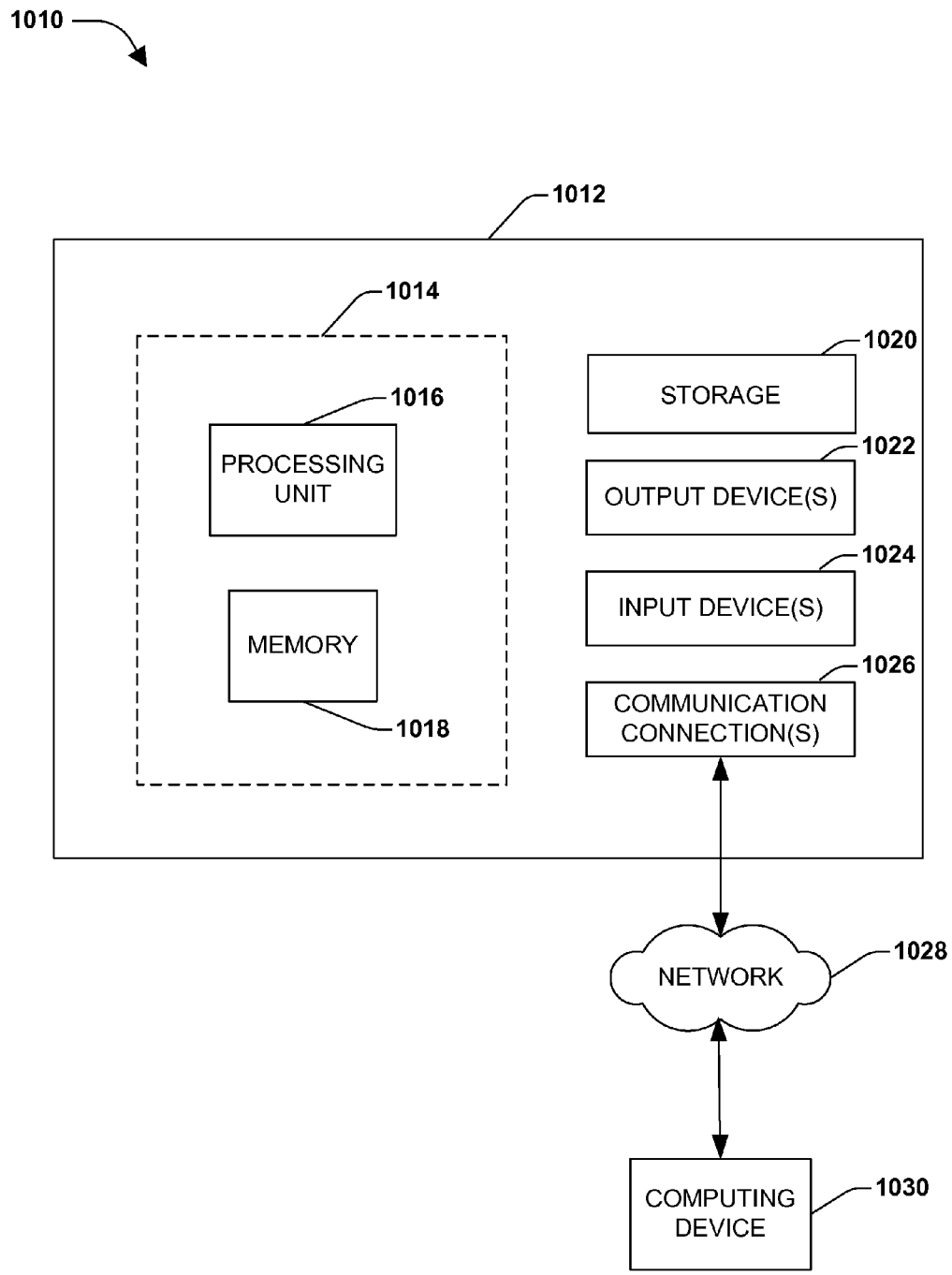
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for collecting and analyzing server farm information for managing a server farm, comprising:
    identifying a list of servers running in the server farm;
    collecting performance metrics from respective identified servers and storing the performance metrics in a collection database, comprising:
        determining that at least some performance metrics are not available for at least a part of a first server;
        responsive to determining that at least some performance metrics are not available, determining a hardware configuration for lab tested hardware;
        determining that the lab tested hardware is comparable to at least the part of the first server; and
        responsive to determining that the lab tested hardware is comparable, collecting performance metrics associated with the lab tested hardware and storing the performance metrics associated with the lab tested hardware in the collection database in association with the first server; and
    analyzing the performance metrics stored in the collection database in accordance with a server farm management request to create an expansion resource capacity plan associated with one or more available hardware upgrades for one or more existing servers within the server farm, the analyzing comprising evaluating a function curve indicative of requests to a server and hardware resource costs of the server to create the expansion resource capacity plan.

2. The method of claim 1, collecting performance metrics comprising one or more of:
    collecting one or more hardware configuration metrics for the server; or
    collecting one or more server usage metrics for the server.

3. The method of claim 2, collecting one or more hardware configuration metrics comprising collecting data traffic routing information for the server.

4. The method of claim 2, collecting one or more server usage metrics comprising one or more of:
    collecting incoming traffic counts over time to the server;
    collecting response counts over time from the server; or
    collecting transaction types for the server.

5. The method of claim 1, identifying a list of servers comprising identifying two or more servers in the server farm comprising heterogeneous hardware configurations.

6. The method of claim 1, analyzing the performance metrics comprising one or more of:
    determining a resource cost on a second server per request based upon request data obtained from a request pipeline; or
    determining a traffic trend of requests per service over time to determine peak usage of a service.

7. The method of claim 1, comprising creating the expansion resource capacity plan based on one or more of:
    server farm traffic patterns;
    forecasted server farm traffic patterns associated with the one or more available hardware upgrades; or
    future releases of application services for the server farm.

8. The method of claim 1, identifying a list of servers running in the server farm comprising one of more of:
    detecting when a second server is added to the server farm; or
    detecting when a third server is removed from the server farm.

9. The method of claim 1, storing the performance metrics in a collection database comprising storing current and historical performance metrics for the respective servers.

10. The method of claim 1, comprising determining that the lab tested hardware is comparable based upon a comparison of the hardware configuration with the part of the first server.

11. The method of claim 1, comprising activating an alert that is triggered when a desired resource capacity threshold is forecasted based at least in part upon the analyzing.

12. The method of claim 1, analyzing the performance metrics comprising determining a forecast of traffic trends for hardware upgrades that have yet to be added to the server farm.

13. A system for collecting and analyzing server farm information for managing a server farm, comprising:
    a capacity collector disposed on one or more servers in the server farm and configured to collect a list of servers running in the server farm;
    a performance collector operably coupled to the capacity collector and configured to collect performance metrics from at least some of the servers on the list;
    a resource consumption repository operably coupled to the performance collector and configured to store performance metrics collected by the performance collector; and
    a data analyzer operably coupled to the resource consumption repository and configured to:
        analyze performance metrics stored in the resource consumption repository in accordance with a server farm management request to create an expansion resource capacity plan associated with one or more available hardware upgrades for one or more existing servers within the server farm;
        evaluate a function curve indicative of requests to a server and hardware resource costs of the server to create the expansion resource capacity plan; and Identify a bottle neck in at least one of a front end associated with the server farm or a back end associated with the server farm to create the expansion resource capacity plan.

14. The system of claim 13, the capacity collector comprising a server service determination component configured to determine whether a server is in-service in the server farm.

15. The system of claim 13, comprising a server farm configuration updater configured to update information for hardware and services running in the server farm.

16. The system of claim 13, comprising a performance metric aggregator configured to aggregate performance metrics collected by the performance collector.

17. The system of claim 13, the data analyzer comprising one or more of:
   a service trend analyzer configured to determine server farm user requests per service type trend information;
   a hardware trend analyzer configured to determine server farm user requests per hardware type trend information; or
   a resource capacity forecaster configured to determine a resource capacity for the server farm based on trend information.

18. The system of claim 13, the data analyzer utilizing a hardware unit cost per request per second for capacity determination.

19. The system of claim 13, comprising a user interface configured to provide a server farm administrator with an ability to request server farm data analysis.

20. A tangible computer readable storage device comprising computer executable instruction that when executed via a processor on a computer perform a method for collecting and analyzing server farm information for managing a server farm, comprising:
   identifying a list of servers running in the server farm, comprising:
      detecting when a first server is added to the server farm; or
      detecting when a second server is removed from the server farm;
   collecting performance metrics from respective identified servers and storing the performance metrics in a collection database, at least some of the performance metrics corresponding to at least two of a central processing unit type, a central processing unit speed, a storage disk size, a storage disk speed, bus weed, a number of one or more connections, a Woe of one or more connections, a number of applications concurrently running on one or more servers, a type of an application comprised in one or more servers, a bandwidth, or a number of databases, collecting performance metrics and storing a performance metrics comprising:
      determining that at least some performance metrics are not available for at least a part of a third server;
      responsive to determining a that at least some performance metrics are not available, determining lab tested hardware,
      determining a that the lab tested hardware is comparable to at least the part of the third server; and
      responsive to determining a that the lab tested hardware is comparable, collecting performance metrics associated with the lab tested hardware and storing a the performance metrics associated with the lab tested hardware in the collection database in association with the third server; and
   analyzing the performance metrics stored in the collection database in accordance with a server farm management request to create an expansion resource capacity plan associated with one or more available hardware upgrades for one or more existing servers within the server farm, the analyzing comprising evaluating a function curve indicative of requests to a server and hardware resource costs of the server to create the expansion resource capacity plan, the expansion resource capacity plan at least one of created or modified based upon at least two of:
      an identification of a bottle neck in at least one of a front end associated with the server farm or a back end associated with the server farm;
      server farm traffic patterns;
      forecasted server farm traffic patterns associated with the one or more available hardware upgrades; or
      future releases of application services for the server farm.

* * * * *